United States Patent
Williams et al.

(10) Patent No.: US 7,322,655 B1
(45) Date of Patent: Jan. 29, 2008

(54) FOOTREST

(75) Inventors: Vera Williams, Honolulu, HI (US);
John S. Harada, Chicago, IL (US);
Noel Nedli, Los Angeles, CA (US)

(73) Assignee: Aloha Investments, LLC, Los Angeles, CA (US)

( * ) Notice: Subject to any disclaimer, the term of this patent is extended or adjusted under 35 U.S.C. 154(b) by 0 days.

(21) Appl. No.: 11/530,350

(22) Filed: Sep. 8, 2006

(51) Int. Cl.
*A47C 7/52* (2006.01)

(52) U.S. Cl. .......................... 297/423.15; 297/423.18; 297/423.4

(58) Field of Classification Search ............. 297/423.1, 297/423.4, 423.15, 423.18; 5/648–650
See application file for complete search history.

(56) References Cited

U.S. PATENT DOCUMENTS

| | | | | |
|---|---|---|---|---|
| 402,130 | A * | 4/1889 | Bedford | 297/423.15 |
| 1,218,876 | A * | 3/1917 | Liverson | 5/630 |
| 2,821,335 | A | 1/1958 | White | |
| 3,285,658 | A * | 11/1966 | Cleveland | 297/395 |
| 3,803,645 | A * | 4/1974 | Oliverius | 5/650 |
| 3,957,041 | A | 5/1976 | Wilder | |
| 3,993,349 | A | 11/1976 | Neufeld et al. | |
| 4,013,318 | A * | 3/1977 | Piper | 297/423.4 |
| 4,104,746 | A | 8/1978 | Goetz | |
| 4,315,655 | A | 2/1982 | Machnik | |
| 4,553,635 | A | 11/1985 | Johnson | |
| 4,759,425 | A | 7/1988 | Turner | |
| 4,800,989 | A | 1/1989 | Valenti | |
| 4,854,313 | A | 8/1989 | Kloepper | |
| 4,869,499 | A | 9/1989 | Schiraldo | |
| 5,025,802 | A | 6/1991 | Laico et al. | |
| 5,188,383 | A * | 2/1993 | Thompson | 297/423.1 |
| 5,192,155 | A | 3/1993 | Meyer | |
| 5,207,481 | A * | 5/1993 | Ayala et al. | 297/464 |
| 5,309,584 | A | 5/1994 | Parker | |
| 5,556,167 | A * | 9/1996 | Johnson Siemion | 297/423.15 |
| 5,558,609 | A | 9/1996 | Olschansky et al. | |
| 5,632,726 | A | 5/1997 | Repice et al. | |
| 5,967,947 | A | 10/1999 | Glover | |
| 6,019,194 | A | 2/2000 | Loomis et al. | |
| 6,530,893 | B1 | 3/2003 | Castelli | |
| 6,874,184 | B2 | 4/2005 | Chandler | |
| 6,976,971 | B2 | 12/2005 | Scudere | |

\* cited by examiner

*Primary Examiner*—Peter R. Brown
(74) *Attorney, Agent, or Firm*—Sonnenschein Nath & Rosenthal LLP

(57) ABSTRACT

A footrest comprising a sling having two ends and a strap connected to each end of the sling. A user in a seat rests a foot in the sling where the straps of the sling are attached around an object in front of the seat.

12 Claims, 5 Drawing Sheets

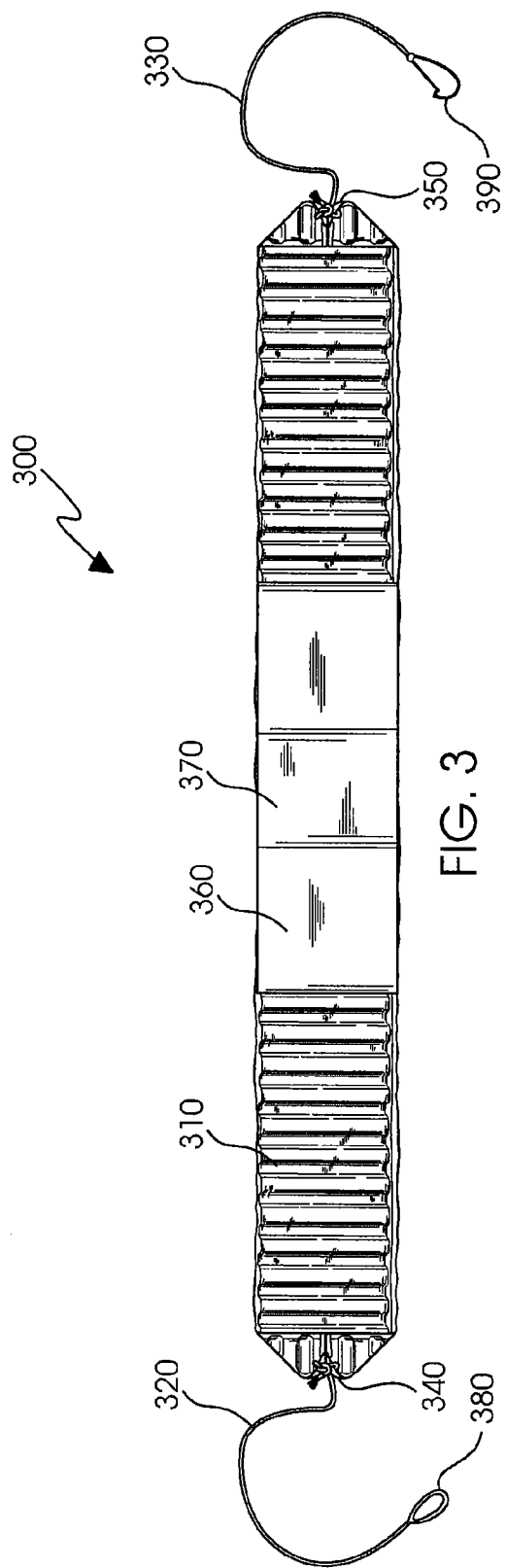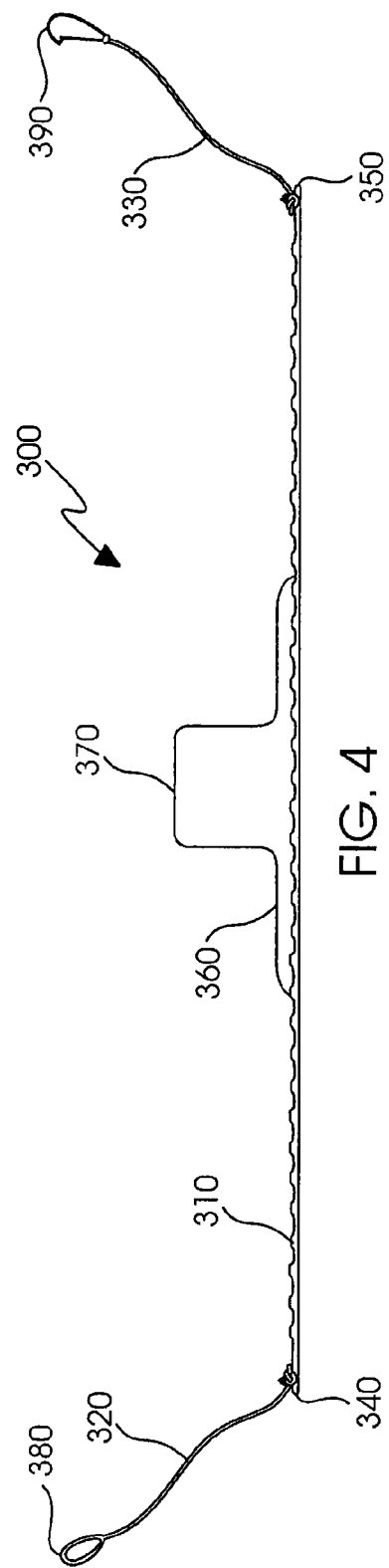

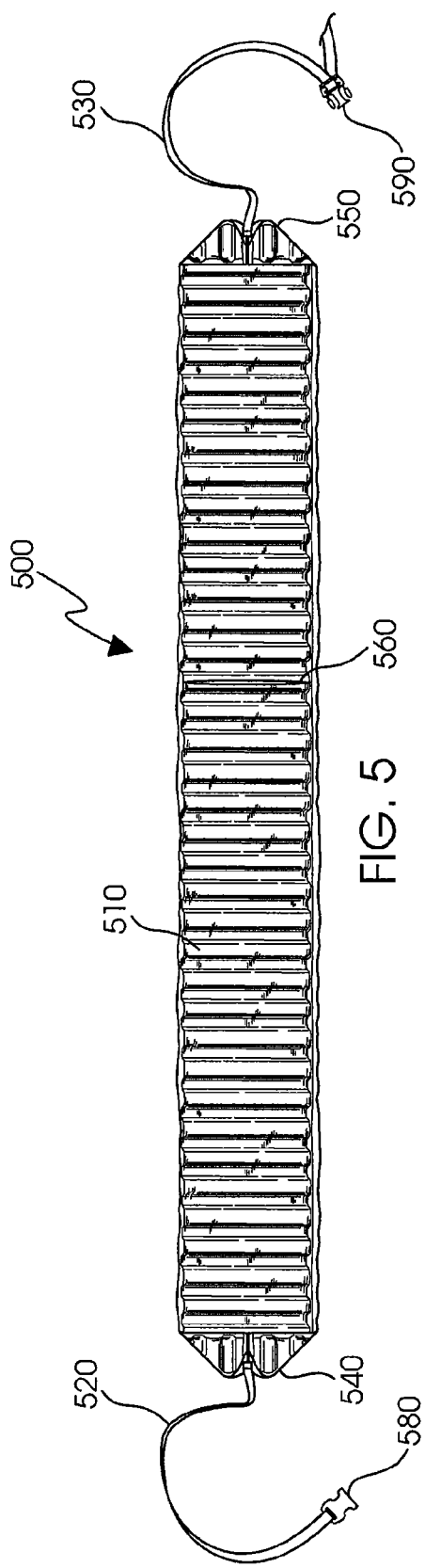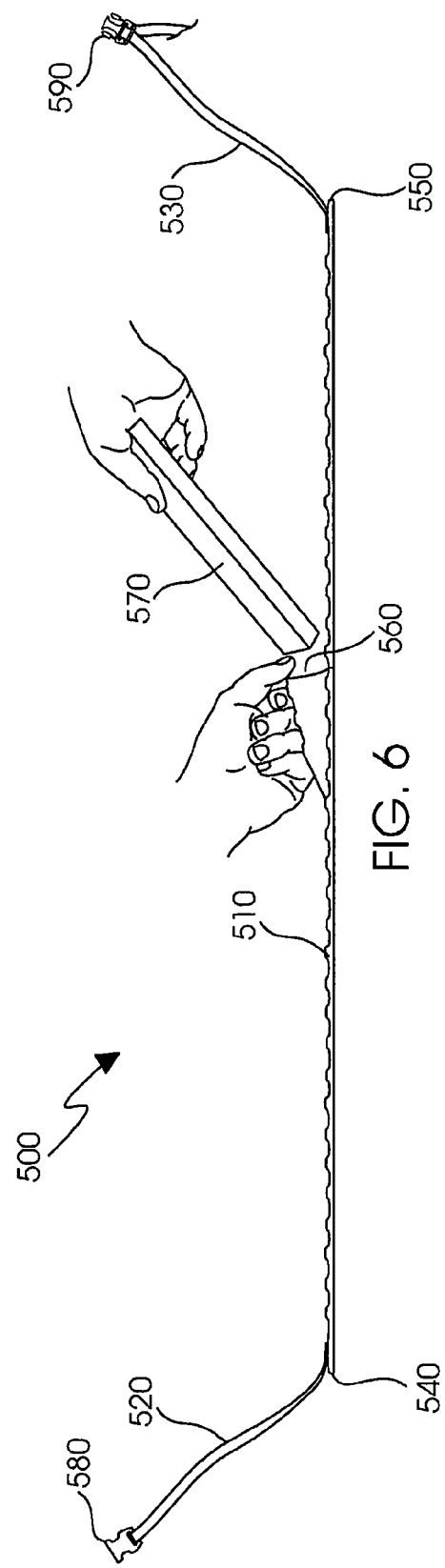

FOOTREST

FIELD OF THE INVENTION

The present invention relates to the field of footrests, and more particularly to compact, portable, hammock style footrests.

BACKGROUND OF THE INVENTION

Many benefits may be achieved by elevating feet on a footrest. For example, a user in a seated position may relieve lower-back pain by elevating the user's feet. In addition, for people with short legs, painful cramps may develop behind the thighs when seated for prolonged periods of time. This often occurs during long flights, long trips in buses or automobiles, or long meetings.

Conventional footrests tend to be bulky, and are not easily portable. Moreover, because these footrests typically rest on the surface below the user, it is difficult to adjust the height of these footrests to account for users with different leg lengths.

SUMMARY OF THE INVENTION

In accordance with the present invention, a footrest is provided that comfortably elevates the legs in various settings. The footrest is compact, and easily portable. Moreover, the height of the footrest is easily adjustable for users with different leg lengths.

In accordance with one embodiment consistent with the present invention, a footrest is provided. The footrest includes a sling having two ends and a strap connected to each end of the sling. The straps of the sling are attached around an object in front of the user's seat so that the user may rest his or her feet in the sling.

In accordance with another embodiment consistent with the present invention, a footrest is provided. The footrest includes a sling having two ends and a slit, a strap connected to each end of the sling, and a pillow that is insertable into the sling through the slit.

In accordance with methods consistent with the present invention, a method is provided for elevating a foot while in a seat. The method comprising the steps of using a footrest having a sling with two ends and two straps where one strap is connected to one end of the sling and the other strap is connected to the other end of the sling, connecting the straps around an object in front of the seat, and placing a user's foot in the sling.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 3 depicts a second embodiment of a footrest in accordance with the present invention;

FIG. 4 depicts a side view of the footrest depicted in FIG. 3;

FIG. 5 depicts a third embodiment of a footrest in accordance with the present invention;

FIG. 6 depicts a side view of the footrest depicted in FIG. 5;

DETAILED DESCRIPTION OF THE INVENTION

Reference now will be made in detail to an implementation consistent with the present invention as illustrated in the accompanying drawings. Wherever possible, the same reference numbers will be used throughout the drawings and the following description to refer to the same or like parts.

Figure 1:
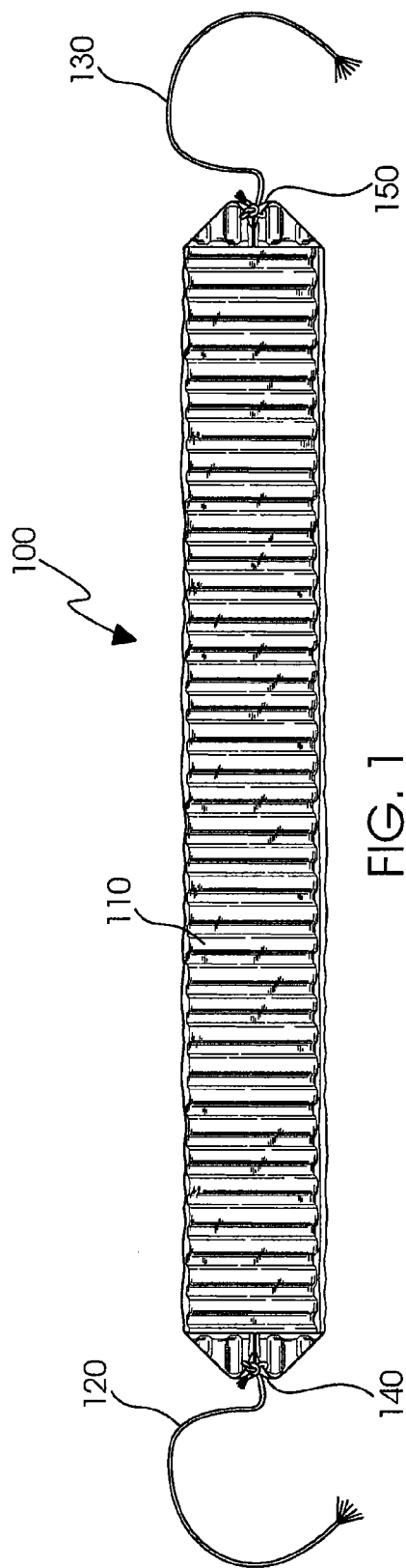
FIG. 1 depicts the top view of a footrest in accordance with the present invention.
Figure 2:
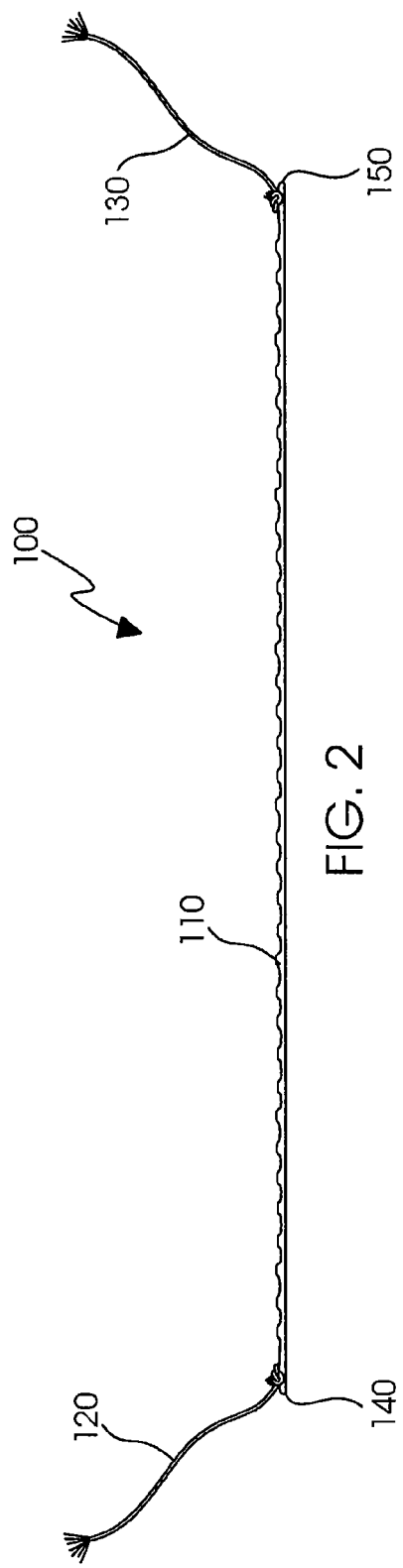
FIG. 2 depicts a side view of the footrest depicted in FIG. 1.

FIGS. 1 and 2 depict one embodiment of a footrest 100 consistent with the present invention. The footrest 100 includes a sling 110 and two straps 120, 130 connected to two ends 140, 150 of the sling 110. The ends of the straps 120, 130 may be connected by tying the straps 120, 130 together. Although depicted as a textured, flexible material, the sling 110 may be made of any flexible material known in the art, including leather, cloth or plastic. Due to the flexibility of the footrest, the entire footrest may be folded to a pocket size for portability.

FIGS. 3 and 4 depict another embodiment of a footrest 300 consistent with the present invention. The footrest 300 includes a sling 310 and two straps 320, 330 connected to two ends 340, 350 of the sling 310. The footrest 300 also includes a platform 360 embedded in the center of the sling 310 so that, in use, the legs may rest on the platform 360. The platform 360 may be made of a variety of materials known in the art, including a rigid material, a flexible material, padding or foam. The footrest 300 further includes a partition 370 extending from the sling 310 above the platform 360. In use, the partition 370 may be placed between the user's feet. The partition 370 may be made of a variety of materials known in the art, including a rigid material, a flexible material, padding or foam. The straps 320, 330 may be connected by inserting a loop 380 attached to the end of the strap 320 into a hook 390 attached to the end of the other strap 330.

FIGS. 5 and 6 depict another embodiment of a footrest 500 consistent with the present invention. The footrest 500 includes a sling 510 and two straps 520, 530 connected to two ends 540, 550 of the sling 510. The footrest 500 also includes a pillow 570 that may be inserted through a slit 560 in the sling 510. The pillow 570 may be made of a variety of materials known in the art, including a rigid material, a flexible material, padding or foam. The footrest 500 also includes clasps 580, 590 at the end of the straps 520, 530 to easily connect the ends of the straps. One of the clasps 590 is depicted with a strap adjustor to easily adjust the length of the strap. One skilled in the art will appreciate that either or both ends of the straps may be adjustable using any system known in the art. Moreover, although a hook 390 and loop 380 and clasps 580, 590 are depicted in FIGS. 3-6, one skilled in the art will appreciate that other connectors known in the art may be used, including a Velcro-type fastener or a buckle. Finally, although depicted as three different embodiments, one skilled in the art will recognize that any combination of the features may be included in a footrest consistent with the present invention.

Figure 7:
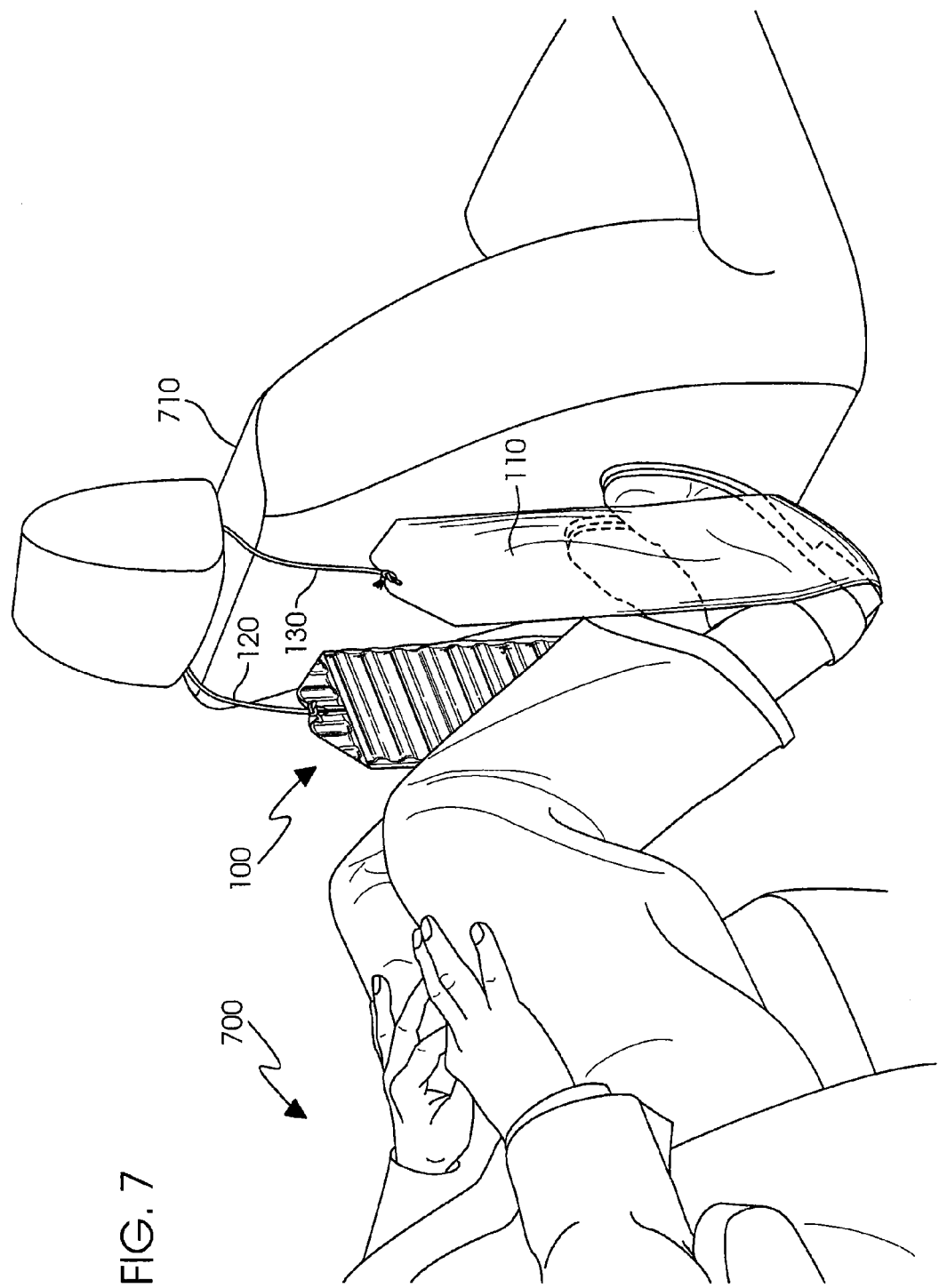
FIG. 7 depicts the footrest depicted in FIG. 1 in use.
Figure 8:
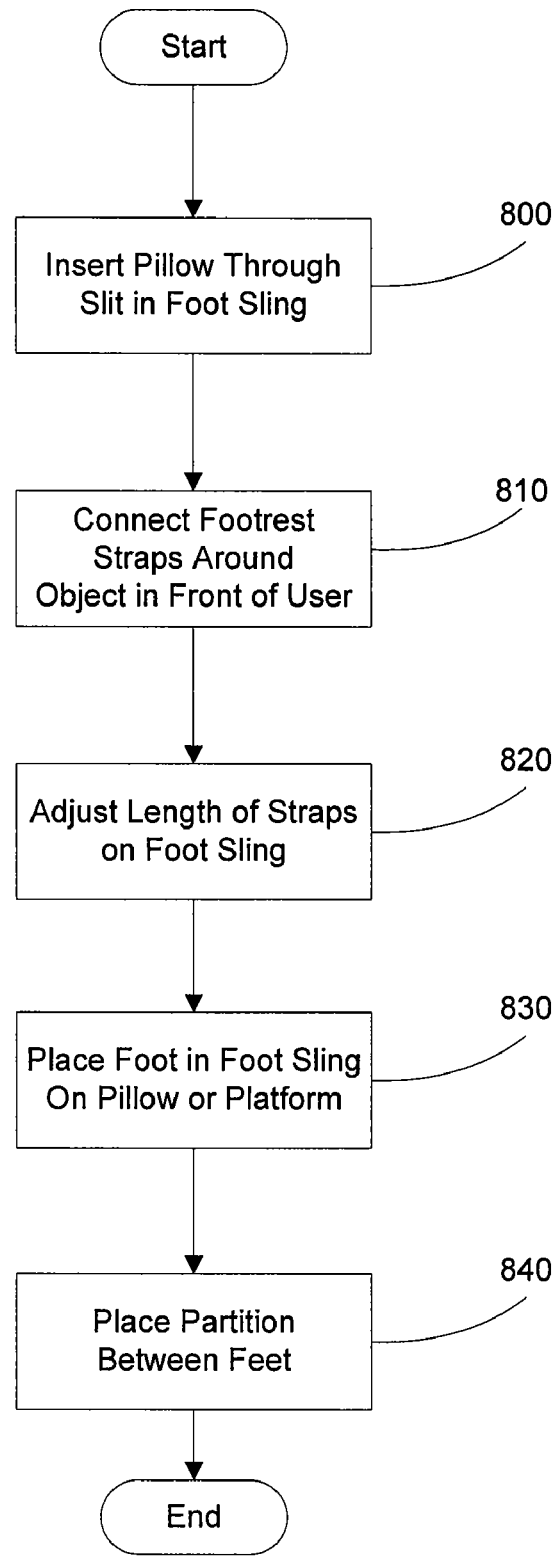
FIG. 8 depicts a flow diagram illustrating the use of the footrest in accordance with the present invention.

FIG. 7 depicts the footrest in use, and FIG. 8 depicts a flow diagram illustrating the use of the footrest in accordance with methods consistent with the present invention. The user 700 may insert the pillow 570 through the slit in the foot sling (step 800). Alternatively, the user may use a footrest with a built-in platform 360, or may use a footrest without a pillow or platform. The user 700 may then connect the straps 120, 130 of the footrest 100 around an object 710 in front of the user's seat (step 810), and adjust the length of the straps (step 820). As discussed above, the user may connect the straps by tying the ends together, by inserting the hook 390 into the loop 380, by attaching the clasps 580, 590 together, or by any other known method in the art. The user may then place his or her feet into the sling 110 of the footrest 100, on the pillow or platform if appropriate (step 830). If the footrest includes a partition 370, the user may place the partition 370 between the user's feet (step 840).

The user may use the footrest of the present invention while traveling in a vehicle, such as a car or an airplane. The user may attach the footrest to a headrest of the seat in front of the user. Alternatively, the user may attach the footrest to a tray table in front of the user, and return the tray table to its upright position. One skilled in the art will appreciate that these footrests also may be used while seated in any setting as long as there is an object in front of the user to which the user may attach the footrest.

The foregoing description of an implementation of the invention has been presented for purposes of illustration and description. It is not exhaustive and does not limit the invention to the precise form disclosed. Modifications and variations are possible in light of the above teachings or may be acquired from practicing the invention.

What is claimed is:

1. A footrest, comprising:
   a sling having two ends;
   a strap connected to each end of the sling; and
   a partition extending from the sling;
   wherein,
   the straps of the sling are attached around an object in front of the seat, and a user rests both feet in the sling with the partition between the feet.

2. The footrest according to claim 1, wherein the straps are attached using a connector.

3. The footrest according to claim 2, wherein the connector comprises one of a hook and loop, clasps, a hook-and-loop fastener, and a buckle.

4. The footrest according to claim 1, wherein the straps are attached by tying the straps together.

5. The footrest according to claim 1, wherein the straps are adjustable.

6. The footrest according to claim 1, wherein the sling comprises one of leather, cloth and plastic.

7. The footrest according to claim 1, further comprising a pillow, wherein the sling includes a slit and the pillow is insertable into the sling through the slit.

8. The footrest according to claim 1, further comprising a platform embedded into the sling, wherein the leg rests on the platform.

9. The footrest according to claim 8, wherein the platform comprises one of a rigid material, a flexible material, padding and foam.

10. A method of elevating a foot while in a seat, the method comprising the steps of:
    using a footrest having a sling with two ends and two straps wherein one of the straps is connected to one end of the sling and the other strap is connected to the other end of the sling;
    connecting the straps around an object in front of the seat;
    placing a user's foot in the sling; and
    placing another foot of the user in the slings wherein a partition extending from the sling separates the user's feet.

11. The method of claim 10, further comprising the step of inserting a pillow into the sling through a slit in the sling, wherein the user's foot is placed on the pillow.

12. The method of claim 10, further comprising the step of adjusting a length of one of the straps.

\* \* \* \* \*